US009759635B2

(12) United States Patent
Park

(10) Patent No.: US 9,759,635 B2
(45) Date of Patent: Sep. 12, 2017

(54) CARRIAGE STRUCTURE FOR VEHICLE TEST

(71) Applicant: Hyundai Motor Company, Seoul (KR)

(72) Inventor: Un Chin Park, Seoul (KR)

(73) Assignee: Hyundai Motor Company, Seoul (KR)

( * ) Notice: Subject to any disclaimer, the term of this patent is extended or adjusted under 35 U.S.C. 154(b) by 106 days.

(21) Appl. No.: 14/836,096

(22) Filed: Aug. 26, 2015

(65) Prior Publication Data

US 2016/0305850 A1 Oct. 20, 2016

(30) Foreign Application Priority Data

Apr. 14, 2015 (KR) .......................... 10-2015-0052290

(51) Int. Cl.
*G01M 17/007* (2006.01)

(52) U.S. Cl.
CPC ................................ *G01M 17/007* (2013.01)

(58) Field of Classification Search
CPC ............ G01M 17/0078; G01M 17/00; G01M 17/007; G01M 17/0076; G01M 15/00
USPC .......... 73/117.01, 117.02, 117, 12.04, 12.05, 73/12.06
See application file for complete search history.

(56) References Cited

U.S. PATENT DOCUMENTS

| 5,777,243 | A | * | 7/1998 | Kewish ............. G01M 17/0074 180/209 |
| 6,435,001 | B1 | * | 8/2002 | Song ....................... G01M 7/08 73/12.04 |
| 8,365,618 | B2 | | 2/2013 | Kruse |
| 2007/0260438 | A1 | * | 11/2007 | Langer ................ G01M 17/007 703/8 |

(Continued)

FOREIGN PATENT DOCUMENTS

| CN | 202075134 U | 12/2011 |
| CN | 202582864 U | 12/2012 |

(Continued)

OTHER PUBLICATIONS

Park Un-Chin et al., *The trolley test way of IIHS small overlap and side test—with minimized structure usage*—24th ESV Conference ('15.⅝~⁶⁄₁₂ Sweden Gothenburg).

*Primary Examiner* — Lisa Caputo
*Assistant Examiner* — Philip Cotey
(74) *Attorney, Agent, or Firm* — Morgan, Lewis & Bockius LLP

(57) ABSTRACT

A carriage structure for a vehicle test may include a power train substitution part provided in a front wheel carriage frame and including weight plates mounted at a connection part at which an upper member and a center beam are connected to each other, door substitution parts provided at both sides of the front wheel carriage frame, connected to the power train substitution part, and including an upper beam and an lower beam formed in the horizontal direction (Continued)

while having a predetermined interval therebetween and coupled to a rear stand formed in the vertical direction; and a rear wheel carriage substitution part provided at the rear of the front wheel carriage frame, connected to the door substitution parts, and including a floor member forming a lower portion thereof, a truss part connecting the floor member and the front wheel carriage frame to each other, and a weight member.

18 Claims, 17 Drawing Sheets

(56) References Cited

U.S. PATENT DOCUMENTS

| | | | |
|---|---|---|---|
| 2008/0034902 A1* | 2/2008 | Chen | G01M 7/08 73/866.4 |
| 2008/0121014 A1* | 5/2008 | Chen | G01M 17/0078 73/12.01 |
| 2011/0192240 A1* | 8/2011 | Kruse | G01M 17/0078 73/865.3 |
| 2011/0192241 A1 | 8/2011 | Aiki | |
| 2012/0103056 A1* | 5/2012 | Kuriyama | G01M 17/0078 73/12.01 |
| 2013/0055804 A1* | 3/2013 | Preising | G01M 13/027 73/116.01 |

FOREIGN PATENT DOCUMENTS

| | | |
|---|---|---|
| CN | 202757786 U | 2/2013 |
| CN | 102745235 B | 9/2014 |
| JP | 5-209806 A | 8/1993 |
| JP | 2010-190586 A | 9/2010 |
| KR | 10-2008-0026817 A | 3/2008 |
| KR | 10-1317022 B1 | 10/2013 |

* cited by examiner

CARRIAGE STRUCTURE FOR VEHICLE TEST

CROSS-REFERENCE TO RELATED APPLICATION

The present application is based on and claims the benefit of priority to Korean Patent Application No. 10-2015-0052290, filed on Apr. 14, 2015, the entire contents of which is incorporated herein for all purposes by this reference.

BACKGROUND OF THE INVENTION

Field of the Invention

The present invention relates to a carriage structure for a vehicle test, and more particularly, to a carriage structure for a vehicle test capable of selecting only a portion required for small overlap evaluation in a body-in-white structure at the time of a vehicle test and adjusting a length, a width, a weight, a height, and the like, of a carriage by forming the carriage through a substitution part.

Description of Related Art

Generally, a crash test of a vehicle is performed by several methods at the time of developing a new car to obtain study design/manufacturing data that may improve safety and convenience of passengers.

In order to perform the crash test as described above, a body-in-white (BIW) that is the same as that of an actual model of a vehicle is acquired to manufacture a crash test apparatus in advance.

However, common carriage for a simulation crash test according to the related art may not be manufactured before a body-in-white (BIW) of a test target vehicle is acquired, such that a preceding test may not be performed. In addition, even though the body-in-white is acquired, since each kind of vehicles is configured of packages having different forms, a significant time is required for manufacturing the common carriage appropriate for each kind of vehicles, such that a schedule for evaluating and developing components of a new kind of vehicle is delayed.

In addition, conventionally, since a package different from a kind of vehicle may not be mounted, replacement and use are impossible, such that a carriage manufacturing cost depending on each kind of vehicle is separately required.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing provides a carriage structure for a vehicle test capable of selecting only a portion required for small overlap evaluation in a body-in-white structure at the time of a vehicle test and adjusting a length, a width, a weight, a height, and the like, of a carriage by forming the carriage through a substitution part.

According to an aspect of the present invention, a carriage structure for a vehicle test may include a power train substitution part provided in a front wheel carriage frame having a vehicle shape and including weight plates mounted at a connection part at which an upper member formed in a horizontal direction and a center beam formed in a vertical direction are connected to each other and having the same weight as those of an engine and a transmission, door substitution parts provided at both sides of the front wheel carriage frame, connected to the power train substitution part, and including an upper beam and a lower beam formed in the horizontal direction while having a predetermined interval therebetween and coupled to a rear stand formed in the vertical direction, and a rear wheel carriage substitution part provided at the rear of the front wheel carriage frame, connected to the door substitution parts, and including a floor member forming a lower portion thereof, a truss part connecting the floor member and the front wheel carriage frame to each other, and a weight member maintaining a weight of the floor member.

The carriage structure for a vehicle test may further include a cowl bar substitution part formed in the horizontal direction in front of a vehicle chamber of the front wheel carriage frame.

The carriage structure for a vehicle test may further include a roof member substitution part connecting upper ends of both sides of the front wheel carriage frame to each other.

The upper member and the center beam of the power train substitution part may be formed in a T shape, and the power train substitution part may further include a middle member formed in the horizontal direction at the center of the center beam, and a left beam and a right beam connecting the upper member and the middle member to each other and formed in the vertical direction.

The power train substitution part may further include an inclined bar connected from an intersection point between the upper member and the right beam to an intersection point between the middle member and the left beam in an inclined shape.

The power train substitution part may further include a member stopper formed below one end of the upper member, connected to the front wheel carriage frame, and having a panel shape.

The power train substitution part may further include a roll rod link provided at a lower portion of the center beam and connected to a roll rod provided in the front wheel carriage frame by bolting.

The power train substitution part may include a first upper bar formed in the horizontal direction on one end of the upper member and 1-point-bolted to one end of the front wheel carriage frame, and a second upper bar formed in the horizontal direction beneath one end of the upper member and 2-point-bolted to one end of the front wheel carriage frame.

The power train substitution part may further include a third upper bar provide in front and rear directions beneath the other end of the upper member, and a mounting bracket connecting the third upper bar and the other end of the front wheel carriage frame to each other by bolting.

A plurality of weight plates may be formed and mounted in the power train substitution part so as to distribute and adjust a weight of a power train depending on thicknesses thereof.

The door substitution part may include an upper plate provided at one end of the upper beam and hinge-rotatably mounted on a side surface of the front wheel carriage frame, and a lower plate provided at one end of the lower beam and hinge-rotatably mounted on the side surface of the front wheel carriage frame.

The cowl bar substitution part may include a main support including a left bar and a right bar connected to each other in the horizontal direction, a center support connected to the main support in the vertical direction and mounted on a bottom surface of the front wheel carriage frame, and a front support connected to the main support in front and rear directions and mounted on a fount surface of the vehicle chamber of the front wheel carriage frame.

The cowl bar substitution part may further include a left bracket and a right bracket provided at a left end of the left bar and a right end of the right bar, respectively, and coupled to A-pillars of the front wheel carriage frame, respectively, a lower bracket provided below the center support and mounted on a dash tunnel of the front wheel carriage frame, and a front bracket provided at a distal end of the front support to allow the front support to be mounted on the front surface of the vehicle chamber of the front wheel carriage frame.

The left bar may be formed to have a diameter larger than that of the right bar, and the front support may be mounted on the left bar of the main support.

The truss part may include a left truss and a right truss each connecting A-pillars of the front wheel carriage frame and a front end portion of the floor member to each other, a left upper side and a right upper side each connecting an upper portion of the rear stand of the door substitution part and the left truss and the right truss to each other, a left lower side and a right lower side each connecting a lower portion of the rear stand of the door substitution part and a rear end portion of the floor member to each other, and a first cross and a second cross each crossing and connecting the left truss and the right truss to each other in an X shape.

The truss part may include a connecting member connecting the floor member and the front wheel carriage frame to each other.

A lower surface of the floor member may be provided with a weight plate supporting the weight member.

The center of the rear of the floor member may be provided with a left panel and a right panel for maintaining a vehicle width, and be additionally provided with a plurality of support columns connecting the left panel and the right panel to each other.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
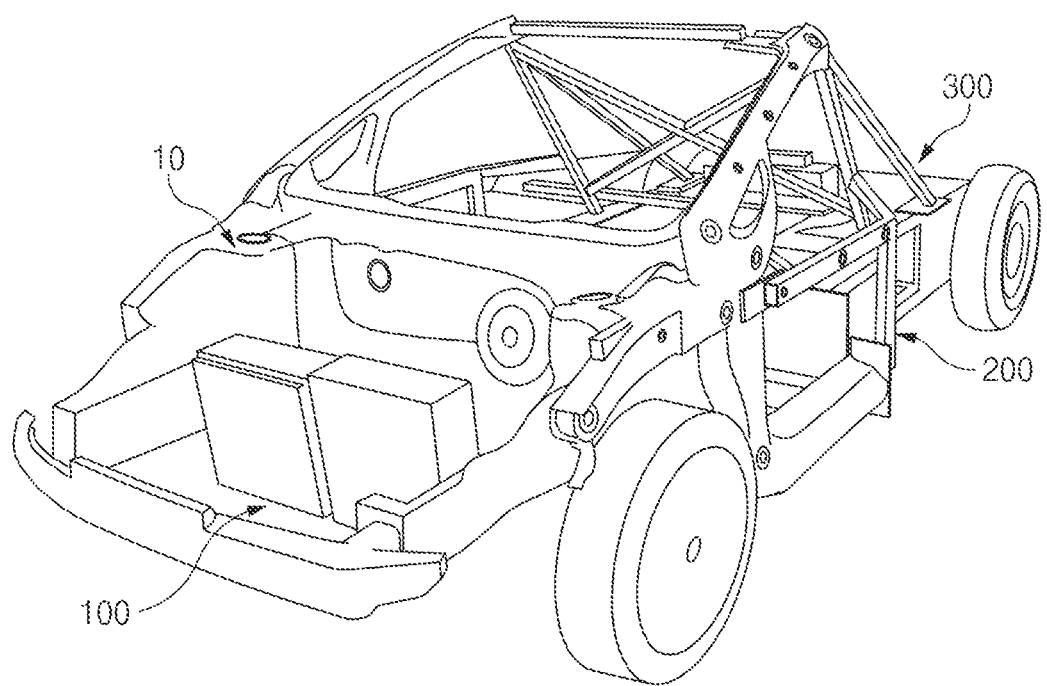
FIG. 1 is a view illustrating a carriage structure for a vehicle test according to an exemplary embodiment of the present invention.
Figure 2:
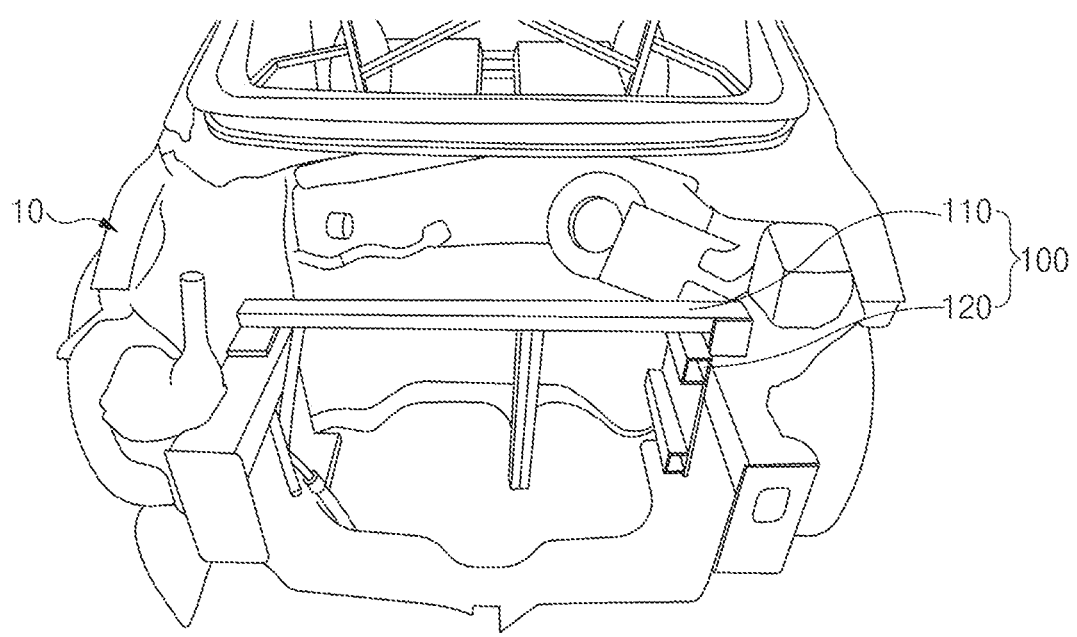
FIG. 2 is a view illustrating a power train substitution part mounted in a front wheel carriage frame in the carriage structure for a vehicle test according to the exemplary embodiment of the present invention.
Figure 3:
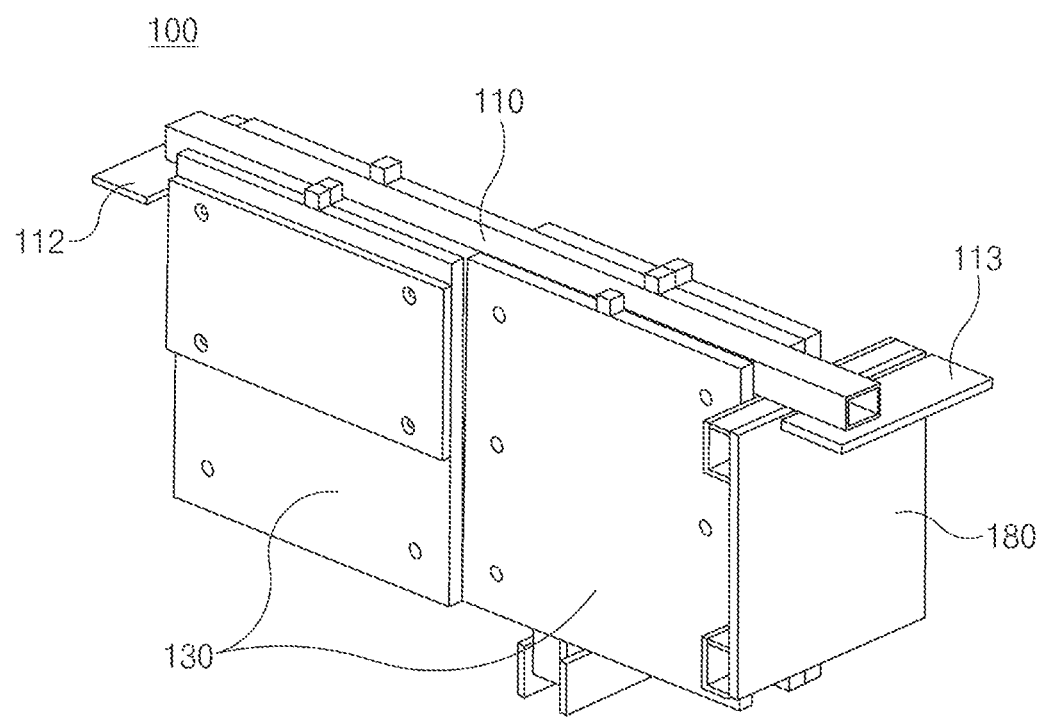
FIG. 3 is a view illustrating the power train substitution part in the carriage structure for a vehicle test according to the exemplary embodiment of the present invention.
Figure 4:
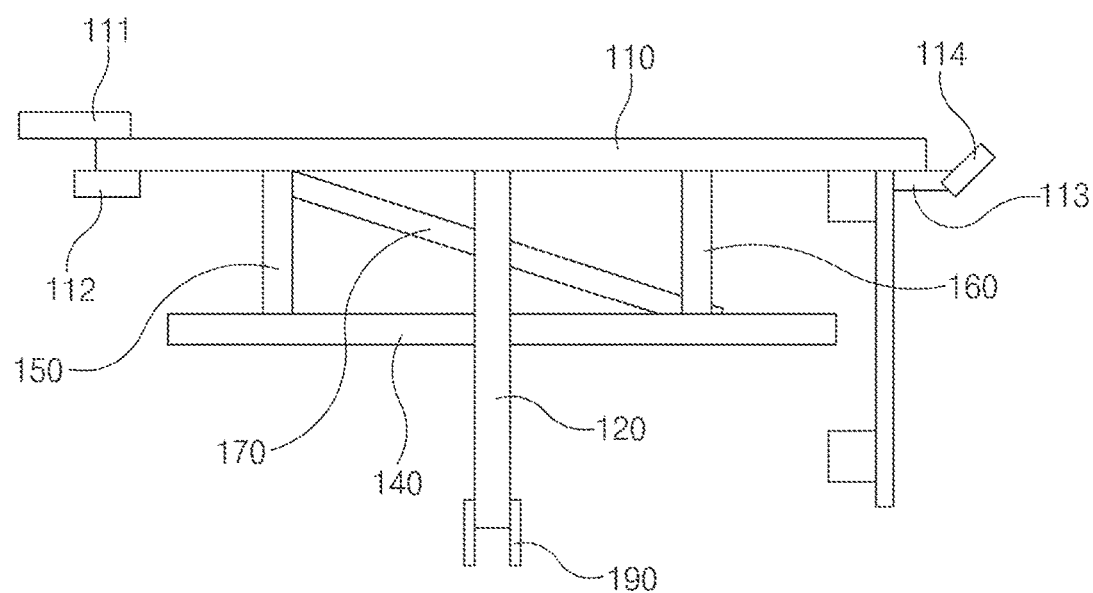
FIG. 4 is a front view illustrating the power train substitution part of the carriage structure for a vehicle test according to the exemplary embodiment of the present invention.
Figure 5:
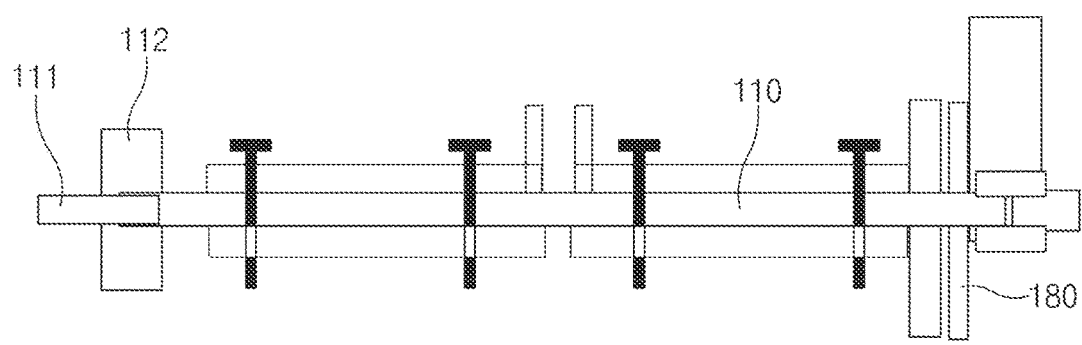
FIG. 5 is a plan view illustrating the power train substitution part of the carriage structure for a vehicle test according to the exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Exemplary embodiments of the present invention will be described in detail with reference to the accompanying drawings.

A carriage structure for a vehicle test according to an exemplary embodiment of the present invention is configured to include a power train substitution part 100 provided in a front wheel carriage frame 10, door substitution parts 200 provided at both sides of the front wheel carriage frame 10 and connected to the power train substitution part 100, and a rear wheel carriage substitution part 300 provided at the rear of the front wheel carriage frame 10 and connected to the door substitution parts 200, as illustrated in FIG. 1.

As illustrated in FIGS. 1 to 5, the power train substitution part 100 is provided in the front wheel carriage frame 10 having a vehicle shape and is mounted like an actual power train, such that a power train does not need to be mounted every time a carriage test is performed.

Here, the power train substitution part 100 includes weight plates 130 mounted at a connection part at which an upper member 110 formed in a horizontal direction and a center beam 120 formed in a vertical direction are connected to each other and having the same weight as those of an engine and a transmission to accurately implement the center of gravity of the power train, thereby making it possible to show the same effect as that of an actual vehicle at the time of a crash.

In addition, it is preferable that a plurality of weight plates 130 may be formed and mounted in the power train substitution part 100 so as to distribute and adjust a weight of the power train depending on thicknesses thereof.

Meanwhile, the upper member 110 and the center beam 120 of the power train substitution part 100 are formed in a T shape, and the power train substitution part 100 includes a middle member 140 formed in the horizontal direction at the center of the center beam 120 and a left beam 150 and a right beam 160 connecting the upper member 110 and the middle member 140 to each other and formed in the vertical direction, and further includes an inclined bar 170 connected from an intersection point between the upper member 110 and the right beam 160 to an intersection point between the middle member 140 and the left beam 150 in an inclined shape, thereby making it possible to maintain structure strength of the power train substitution part 100 and support weights of the weight plates 130.

Here, the respective members forming the power train substitution part 100 are connected to each other by welding to facilitate mounting.

In addition, the power train substitution part 100 includes a member stopper 180 formed in a panel shape to allow a lower portion of one end of the upper member 100 and the front wheel carriage frame 10 to be connected to each other.

In addition, the power train substitution part 100 further includes a roll rod link 190 attached to a lower portion of the center beam 120 by welding and connected to a roll rod provided in the front wheel carriage frame 10 by bolting, such that it is connected in the same scheme as that of an actual vehicle, thereby making it possible to improve test reliability.

Here, it is preferable that the power train substitution part includes a first upper bar 111 formed in the horizontal direction on one end of the upper member 110 and 1-point-bolted to one end of the front wheel carriage frame 10 and a second upper bar 112 formed in the horizontal direction beneath one end of the upper member 110 and 2-point-bolted to one end of the front wheel carriage frame 10 to induct behavior of the power train that is the same as that of the actual vehicle at the time of the crash after the weight plate 130 substituting for the engine is mounted in the power train substitution part 100.

In addition, it is preferable that the power train substitution part 100 includes a third upper bar 113 provide in front and rear directions beneath the other end of the upper member 110 and a mounting bracket 114 connecting the third upper bar 113 and the other end of the front wheel carriage frame 10 to each other by bolting to induct behavior of the power train that is the same as that of the actual vehicle at the time of the crash after the weight plate 130 substituting for the transmission is mounted in the power train substitution part 100.

Figure 6:
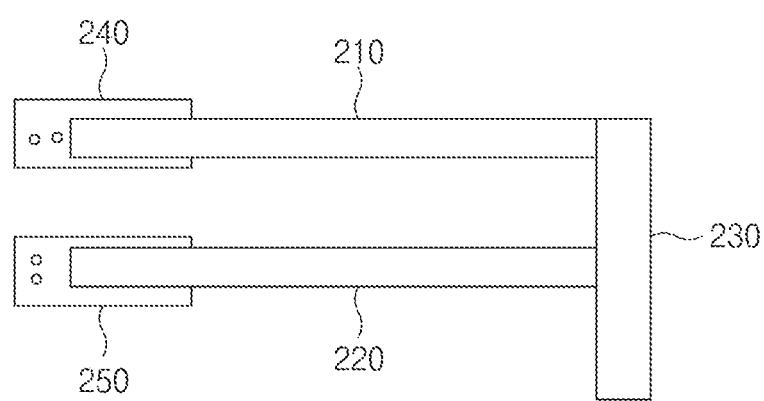
FIG. 6 is a front view illustrating a door substitution part of the carriage structure for a vehicle test according to the exemplary embodiment of the present invention.
Figure 7:
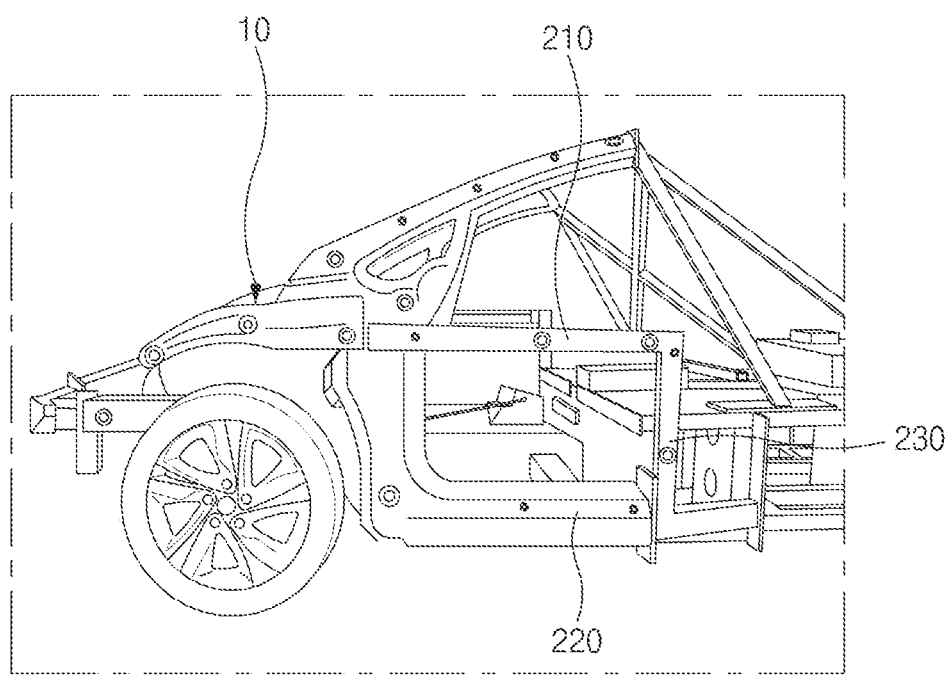
FIG. 7 is a view illustrating the door substitution part mounted in the front wheel carriage frame of the carriage structure for a vehicle test according to the exemplary embodiment of the present invention.

As illustrated in FIGS. 1, 6, and 7, the door substitution parts 200 are provided at both sides of the front wheel carriage frame 10 and are connected to the power train substitution part 100, and include an upper beam 210 and a lower beam 220 formed in the horizontal direction while having a predetermined interval therebetween and coupled to a rear stand 230 formed in the vertical direction, thereby making it possible to show the same effect as those of doors of the actual vehicle at the time of a crash test.

Here, the rear stand 230 substitutes for a B-pillar of the vehicle and allows a load to be transferred to the rear wheel carriage substitution part 300, which is a rigid body.

In addition, the door substitution part 200 includes an upper plate 240 provided at one end of the upper beam 210 and hinge-rotatably mounted on a side surface of the front wheel carriage frame 10 and a lower plate 250 provided at one end of the lower beam 220 and hinge-rotatably mounted on the side surface of the front wheel carriage frame 10 to allow the same mounting scheme as that of hinge-connection between a 2-way beam structure in which a thickness is easily adjusted and the door of the vehicle to be applied, such that the door does not need to be always used at the time of a carriage test, and a modification into a simple structure is possible depending on a situation, thereby making it possible to decrease a cost and improve work convenience.

Figure 8:
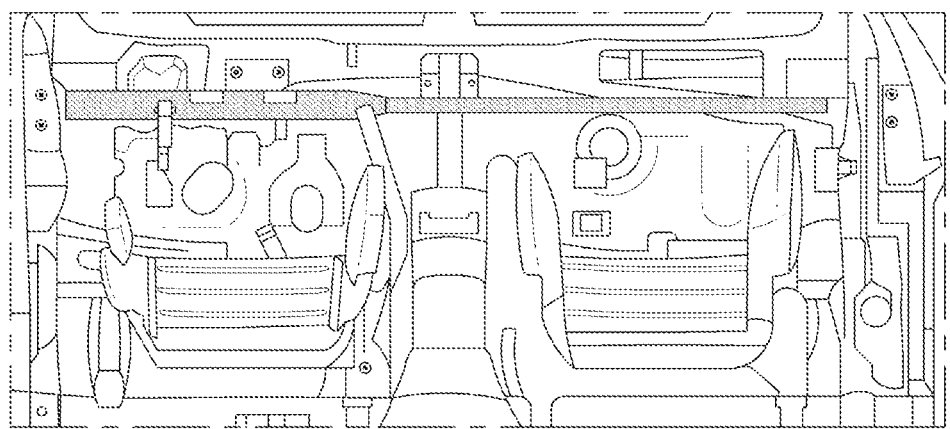
FIG. 8 is a view illustrating a position at which a cowl bar is mounted in an actual vehicle in the carriage structure for a vehicle test according to the exemplary embodiment of the present invention.
Figure 9:
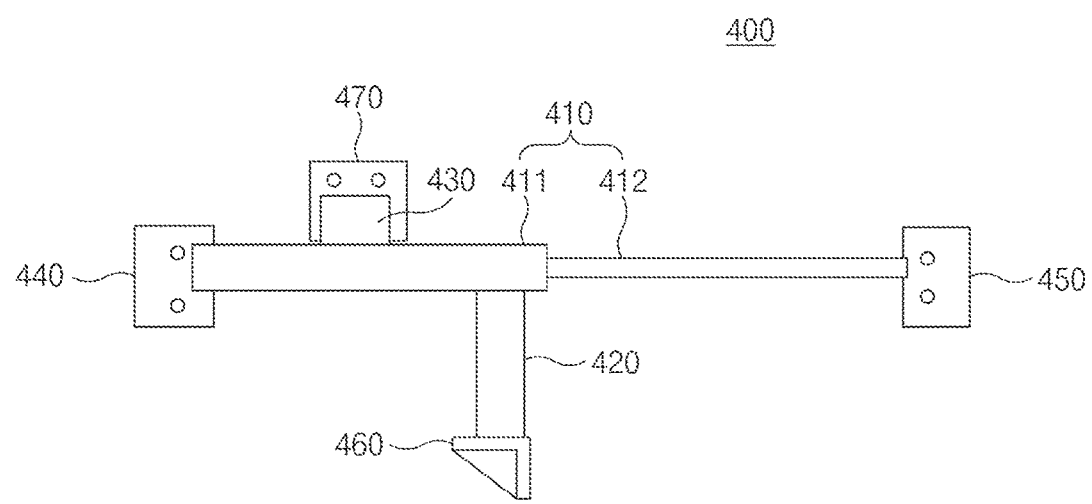
FIG. 9 is a front view illustrating a cowl bar substitution part of the carriage structure for a vehicle test according to the exemplary embodiment of the present invention.
Figure 10:
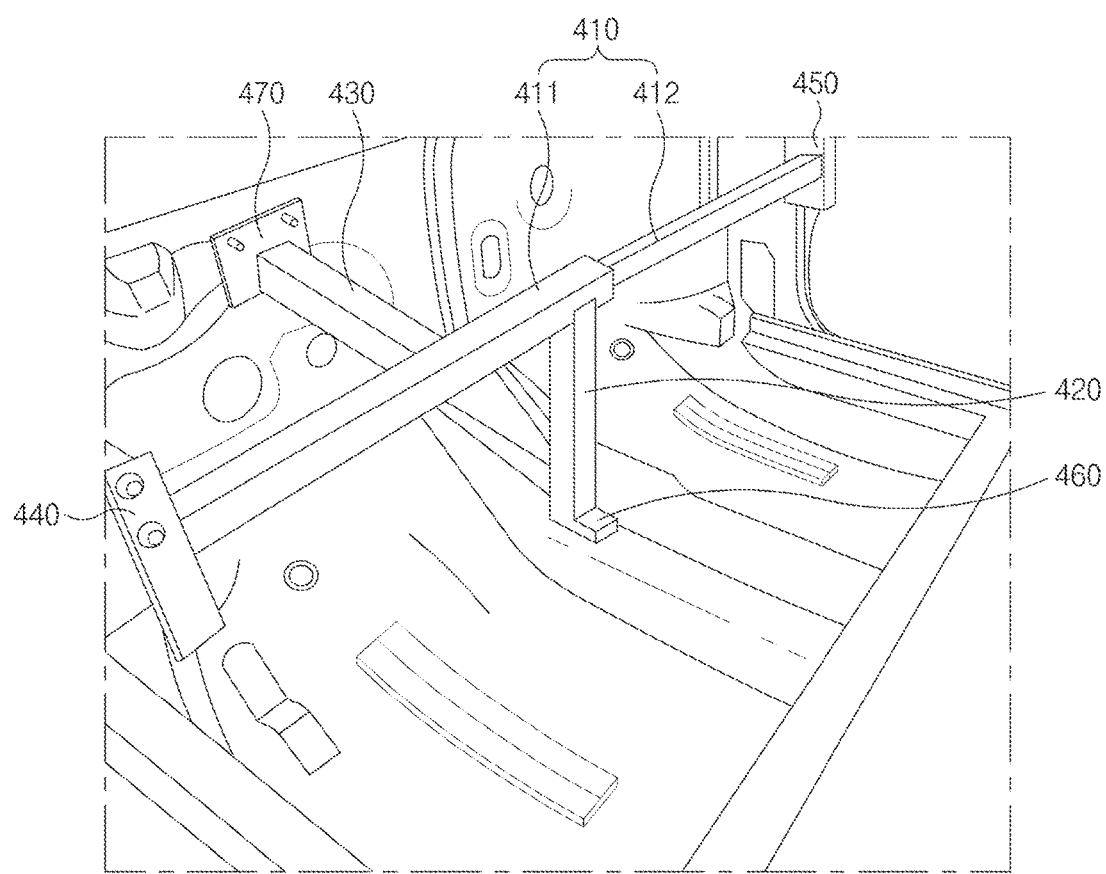
FIG. 10 is a view illustrating the cowl bar substitution part mounted in the front wheel carriage frame of the carriage structure for a vehicle test according to the exemplary embodiment of the present invention.

As illustrated in FIGS. 8 to 10, a cowl bar substitution part 400 is mounted in the horizontal direction in front of a vehicle chamber of the front wheel carriage frame 10, thereby making it possible to show the same effect as that of a cowl bar of the actual vehicle at the time of the crash test.

Figure 11:
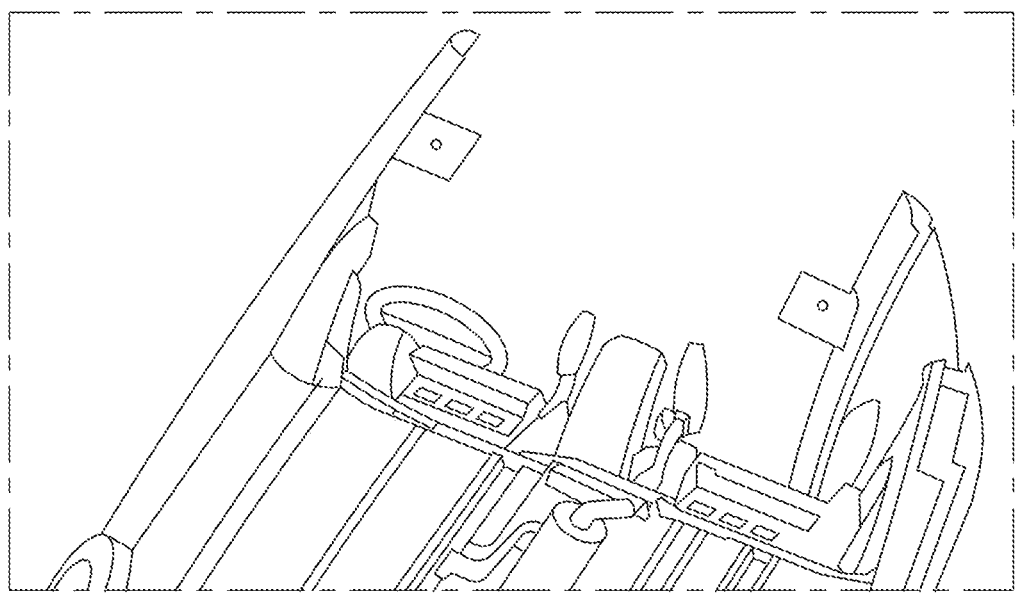
FIG. 11 is a view illustrating a position at which a roof member is mounted in an actual vehicle in the carriage structure for a vehicle test according to the exemplary embodiment of the present invention.
Figure 12:
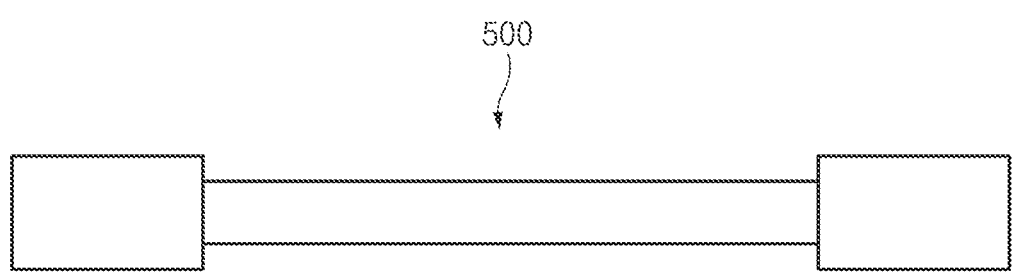
FIG. 12 is a plan view illustrating a roof member substitution part of the carriage structure for a vehicle test according to the exemplary embodiment of the present invention.
Figure 13:
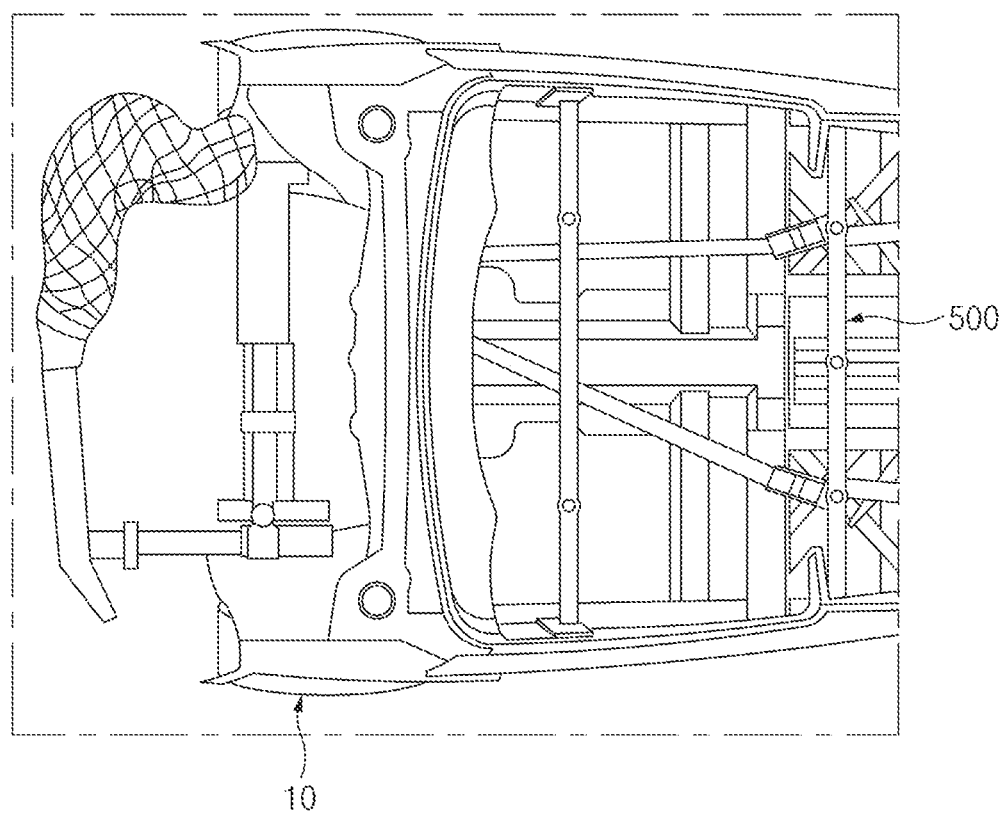
FIG. 13 is a view illustrating the roof member substitution part mounted in the front wheel carriage frame of the carriage structure for a vehicle test according to the exemplary embodiment of the present invention.
Figure 14:
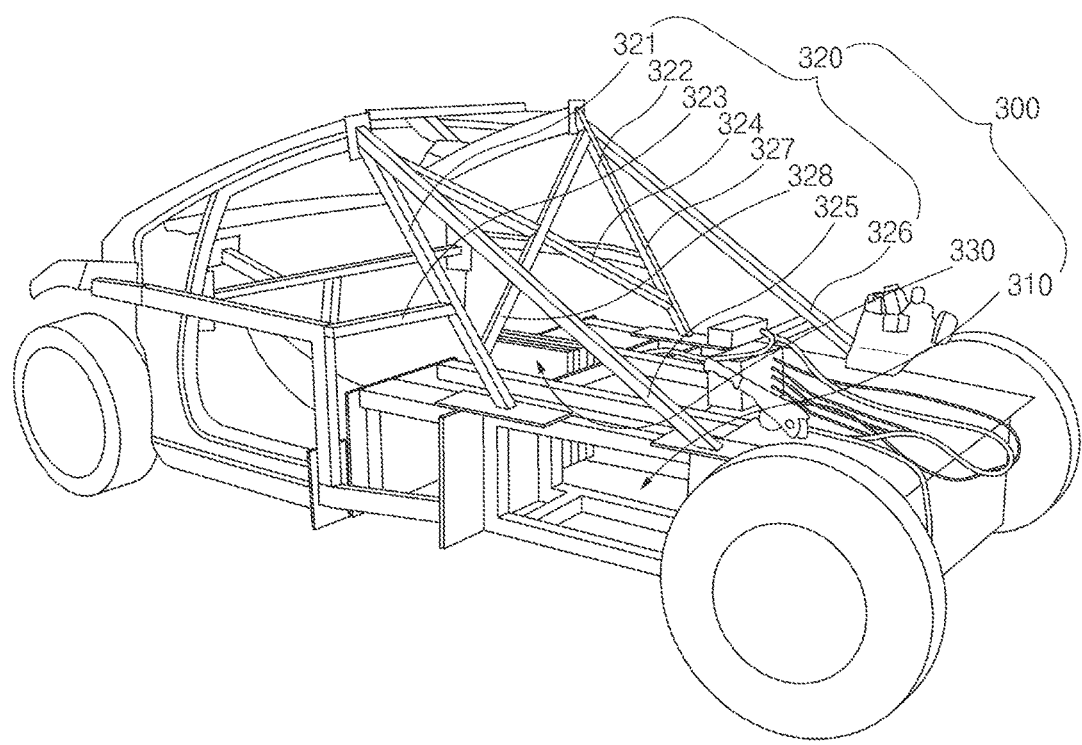
FIG. 14 is a view illustrating a rear wheel carriage substitution part included in the front wheel carriage frame of the carriage structure for a vehicle test according to the exemplary embodiment of the present invention.
Figure 15:
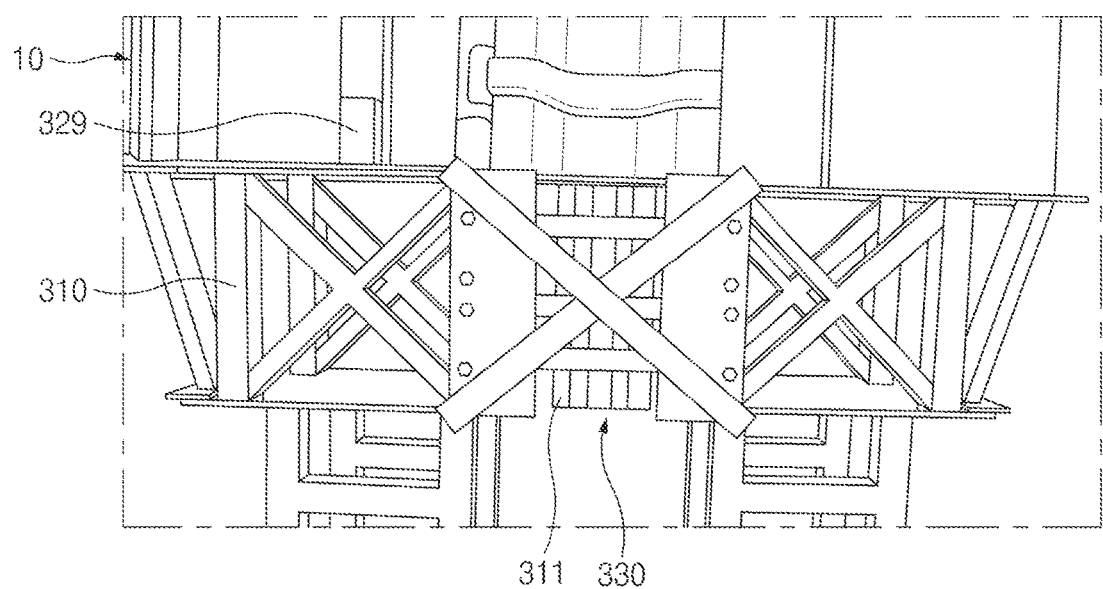
FIG. 15, FIG. 16 and FIG. 17 are views illustrating a floor member of the rear wheel carriage substitution part in the carriage structure for a vehicle test according to the exemplary embodiment of the present invention.
Figure 16:
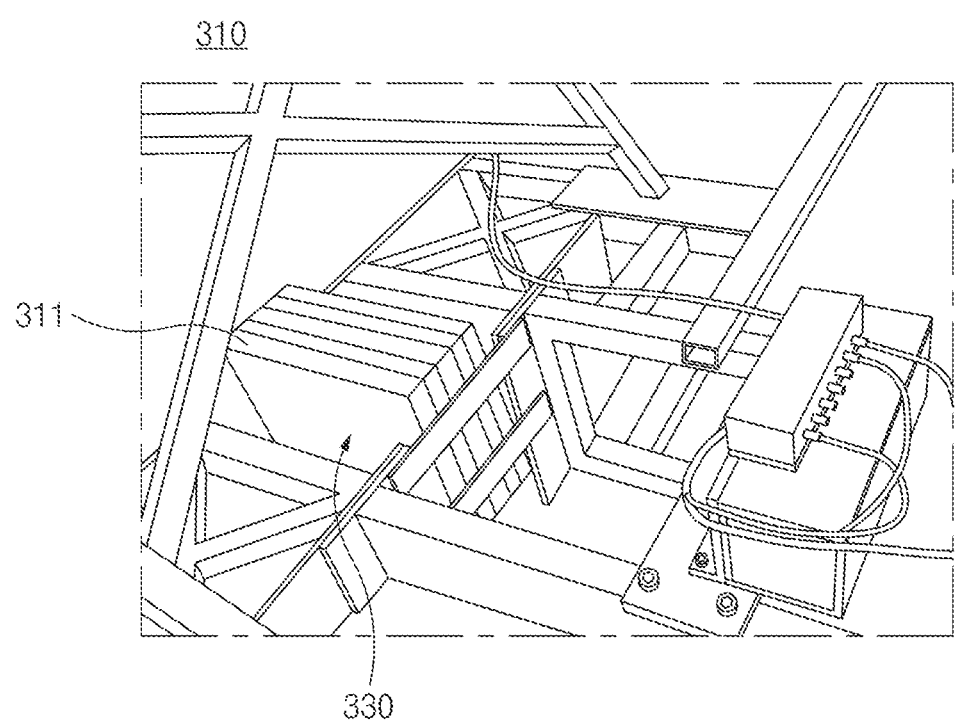
Figure 17:
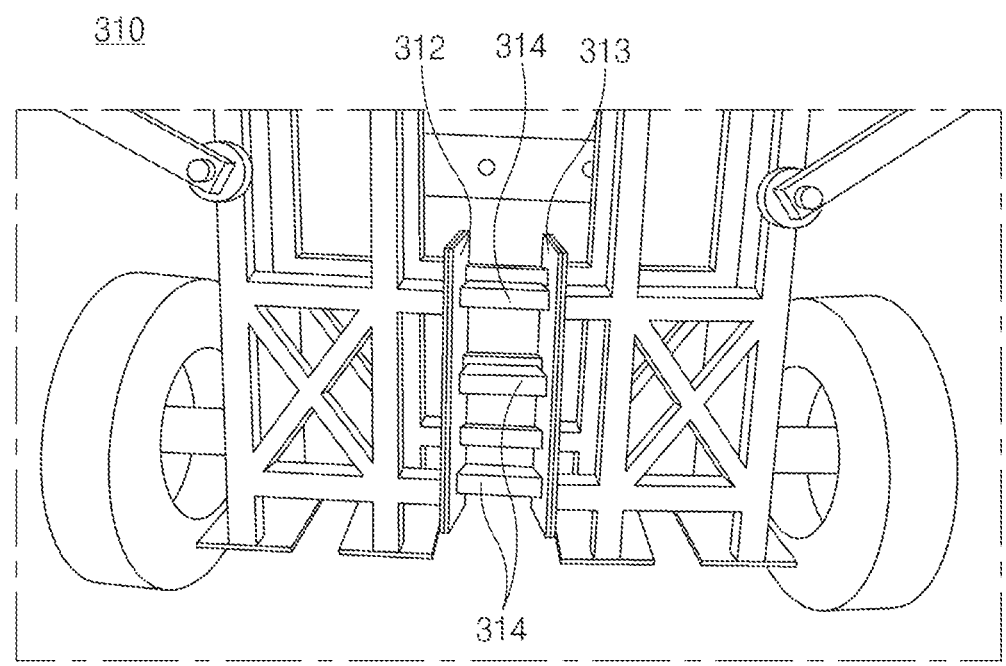

As illustrated in FIGS. 11 to 13, a roof member substitution part 500 connects upper ends of both sides of the front wheel carriage frame 10 to each other, thereby making it possible to show the same effect as that of a roof part of the actual vehicle at the time of the crash test.

In addition, the roof member substitution part 500 may be tuned so that the same deformation mode is induced even after a wind shield glass is deleted, and may allow rigidity of a truss part 320 of a rear wheel carriage substitution part 300 to be described below to be maintained.

Here, the cowl bar substitution part 400 includes a main support 410 including a left bar 411 and a right bar 412 connected to each other in the horizontal direction, a center support 420 connected to the main support 410 in the vertical direction and mounted on a bottom surface of the front wheel carriage frame 10, and a front support 430 connected to the main support 410 in the front and rear directions and mounted on a fount surface of the vehicle chamber of the front wheel carriage frame 10, as illustrated in FIGS. 9 and 10, thereby implementing the same load path as that of the cowl bar of the actual vehicle.

In addition, the cowl bar substitution part 400 includes a left bracket 440 and a right bracket 450 provided at a left end of the left bar 411 and a right end of the right bar 412, respectively, and coupled to A-pillars of the front wheel carriage frame 10, respectively, and a lower bracket 460 provided below the center support 420 and mounted on a dash tunnel of the front wheel carriage frame 10, such that it may be bolted in an x direction and be then fixedly assembled without a step through a '⌐' shape, thereby making it possible to maintain connection rigidity at the time of welding the cowl bar substitution part to a member having a rectangular cross section.

In addition, a front bracket 470 is provided at a distal end of the front support 430 to allow the front support 430 to be mounted on the front surface of the vehicle chamber of the front wheel carriage frame 10, thereby making it possible to maintain dash mounting and connection rigidity with a rectangular cross section.

Here, it is preferable that the left bar 411 is formed to have a diameter larger than that of the right bar 412 and the front support 430 is mounted on the left bar 411 of the main support 410, thereby making it possible to implement a deformation amount similar to that of the actual vehicle.

As illustrated in FIGS. 14 to 17, the rear wheel carriage substitution part 300 is provided at the rear of the front wheel carriage frame 10 and is connected to the door substitution parts 200, thereby making it possible to show the same effect as that of a rear wheel part of the actual vehicle at the time of the crash test.

Here, the rear wheel carriage substitution part 300 includes a floor member 310 forming a lower portion thereof, the truss part 320 connecting the floor member 310 and the front wheel carriage frame 10 to each other, and a weight member 330 maintaining a weight of the floor member 310.

The truss part 320 includes a left truss 321 and a right truss 322 each connecting the A-pillars of the front wheel carriage frame 10 and a front end portion of the floor member 310 to each other, a left upper side 323 and a right upper side 324 each connecting an upper portion of the rear stand 230 of the door substitution part 200 and the left truss 321 and the right truss 322 to each other, a left lower side 325 and a right lower side 326 each connecting a lower portion of the rear stand 230 of the door substitution part 200 and a rear end portion of the floor member 310 to each other, and a first cross 327 and a second cross 328 each crossing and connecting the left truss 321 and the right truss 322 to each other in an X shape to enable evaluation without an upper structure of the vehicle, thereby making it possible to decrease a cost, enable reuse after simple repair, and enable strength maintenance even at the time of small overlap evaluation by analysis and manufacturing experiences to improve test reliability.

It is preferable that a connecting member 329 is provided on the floor member 310 and connects the floor member 310 and the front wheel carriage frame 10 to each other, thereby making it possible to maintain rigidity.

In addition, a lower surface of the floor member 310 is provided with a weight plate 311 to support the weight member and allow the weight plate 311 to be easily loaded.

In addition, it is preferable that the center of the rear of the floor member 310 is provided with a left panel 312 and a right panel 313 to allow a vehicle width to be maintained, and is additionally provided with a plurality of support columns 314 connecting the left panel 312 and the right panel 313 to each other to allow the vehicle width and rigidity in left and right directions to be maintained.

As described above, the carriage structure for a vehicle test according to the exemplary embodiment of the present invention includes the power train substitution part 100 provided in the front wheel carriage frame 10 having a vehicle shape and including the weight plates 130 mounted at the connection part at which the upper member 110 formed in the horizontal direction and the center beam 120 formed in the vertical direction are connected to each other and having the same weight as those of the engine and the transmission, the door substitution parts 200 provided at both sides of the front wheel carriage frame 10, connected to the power train substitution part 100, and including the upper beam 210 and the lower beam 220 formed in the horizontal direction while having the predetermined interval therebetween and coupled to the rear stand 230 formed in the vertical direction, and the rear wheel carriage substitution part 300 provided at the rear of the front wheel carriage frame 10, connected to the door substitution parts 200, and including the floor member 310 forming the lower portion thereof, the truss part 320 connecting the floor member 310 and the front wheel carriage frame 10 to each other, and the weight member 330 maintaining the weight of the floor member 310 to allow only a portion required for small overlap evaluation in a body-in-white structure at the time of a vehicle test to be selected, thereby making it possible to decrease a test cost, improve body-in-white and behavior reproducibility, and implement the same height and weight distribution as that of the vehicle to increase test reliability.

As described above, according to the exemplary embodiment of the present invention, only the portion required for the small overlap evaluation in the body-in-white structure at the time of the vehicle test may be selected, thereby making it possible to decrease the test cost, improve the body-in-white and behavior reproducibility, and implement the same height and weight distribution as that of the vehicle to increase the test reliability.

In addition, the carriage is formed through the power train substitution part, the door substitution parts, the rear wheel carriage substitution part, the cowl bar substitution part, and the roof member substitution part to enable a length, a width, a weight, a height, and the like, of the carriage to be adjusted, thereby enabling a repeated carriage test.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A carriage structure for a vehicle test, comprising:
a power train substitution part provided in a front wheel carriage frame having a vehicle shape having a forward frame section and including weight plates mounted at a connection part at which an upper member formed in a horizontal direction and a center beam formed in a vertical direction are connected to each other and having a same weight as those of an engine and a transmission of a vehicle to be tested;
door substitution parts provided at both sides of the front wheel carriage frame, connected to the power train substitution part, and including an upper beam and an lower beam formed in the horizontal direction while having a predetermined interval therebetween and coupled to a rear stand formed in the vertical direction; and a rear wheel carriage substitution part provided at a rear of the front wheel carriage frame, connected to the door substitution parts, and including a floor member forming a lower portion thereof, a truss part connecting the floor member and the front wheel carriage frame to each other, and a weight member having a predetermined weight for maintaining a weight of the floor member.

2. The carriage structure for the vehicle test according to claim 1, further comprising a cowl bar substitution part formed in the horizontal direction in front of a vehicle chamber of the front wheel carriage frame.

3. The carriage structure for the vehicle test according to claim 1, further comprising a roof member substitution part connecting upper ends of both sides of the front wheel carriage frame to each other.

4. The carriage structure for the vehicle test according to claim 1, wherein the upper member and the center beam of the power train substitution part are in a T shape, and
the power train substitution part further includes:
a middle member formed in the horizontal direction at a center of the center beam; and
a left beam and a right beam connecting the upper member and the middle member to each other and formed in the vertical direction.

5. The carriage structure for the vehicle test according to claim 4, wherein the power train substitution part further includes an inclined bar connected from an intersection point between the upper member and the right beam to an intersection point between the middle member and the left beam in an inclined shape.

6. The carriage structure for the vehicle test according to claim 4, wherein the power train substitution part further includes a member stopper formed below a first end of the upper member, connected to the front wheel carriage frame, and having a panel shape.

7. The carriage structure for the vehicle test according to claim 4, wherein the power train substitution part further includes a roll rod link provided at a lower portion of the center beam and connected to a roll rod provided in the front wheel carriage frame by bolting.

8. The carriage structure for the vehicle test according to claim 4, wherein the power train substitution part includes:
a first upper bar formed in the horizontal direction on a first end of the upper member and 1-point-bolted to a first end of the front wheel carriage frame; and
a second upper bar formed in the horizontal direction beneath the first end of the upper member and 2-point-bolted to the first end of the front wheel carriage frame.

9. The carriage structure for the vehicle test according to claim 8, wherein the power train substitution part further includes:
a third upper bar provide in front and rear directions beneath a second end of the upper member; and
a mounting bracket connecting the third upper bar and a second end of the front wheel carriage frame to each other by bolting.

10. The carriage structure for the vehicle test according to claim 1, wherein a plurality of weight plates are formed and mounted in the power train substitution part to distribute and adjust a weight of a power train depending on thicknesses thereof.

11. The carriage structure for the vehicle test according to claim 1, wherein the door substitution part includes:
an upper plate provided at a first end of the upper beam and hinge-rotatably mounted on a side surface of the front wheel carriage frame; and
a lower plate provided at a first end of the lower beam and hinge-rotatably mounted on the side surface of the front wheel carriage frame.

12. The carriage structure for the vehicle test according to claim 2, wherein the cowl bar substitution part includes:
a main support including a left bar and a right bar connected to each other in the horizontal direction;
a center support connected to the main support in the vertical direction and mounted on a bottom surface of the front wheel carriage frame; and
a front support connected to the main support in front and rear directions and mounted on a fount surface of the vehicle chamber of the front wheel carriage frame.

13. The carriage structure for the vehicle test according to claim 12, wherein the cowl bar substitution part further includes:
a left bracket and a right bracket provided at a left end of the left bar and a right end of the right bar, respectively, and coupled to A-pillars of the front wheel carriage frame, respectively;
a lower bracket provided below the center support and mounted on a dash tunnel of the front wheel carriage frame; and
a front bracket provided at a distal end of the front support to allow the front support to be mounted on the front surface of the vehicle chamber of the front wheel carriage frame.

14. The carriage structure for the vehicle test according to claim 13, wherein the left bar is formed to have a diameter larger than that of the right bar, and the front support is mounted on the left bar of the main support.

15. The carriage structure for the vehicle test according to claim 1, wherein the truss part includes:
a left truss and a right truss each connecting A-pillars of the front wheel carriage frame and a front end portion of the floor member to each other;
a left upper side and a right upper side each connecting an upper portion of the rear stand of the door substitution part and the left truss and the right truss to each other;
a left lower side and a right lower side each connecting a lower portion of the rear stand of the door substitution part and a rear end portion of the floor member to each other; and
a first cross and a second cross each crossing and connecting the left truss and the right truss to each other in an X shape.

16. The carriage structure for the vehicle test according to claim 15, wherein the truss part includes a connecting member connecting the floor member and the front wheel carriage frame to each other.

17. The carriage structure for the vehicle test according to claim 15, wherein a lower surface of the floor member is provided with a weight plate supporting the weight member.

18. The carriage structure for the vehicle test according to claim 1, wherein the center of the rear of the floor member is provided with a left panel and a right panel for maintaining a vehicle width, and is additionally provided with a plurality of support columns connecting the left panel and the right panel to each other.

* * * * *